US008793280B2

(12) United States Patent
McClean et al.

(10) Patent No.: US 8,793,280 B2
(45) Date of Patent: *Jul. 29, 2014

(54) KEY-BREAK AND RECORD-LOOP PROCESSING IN PARALLEL DATA TRANSFORMATION

(75) Inventors: Geoffrey M. McClean, Milton Keynes (GB); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/495,626

(22) Filed: Jun. 13, 2012

(65) Prior Publication Data
US 2012/0259875 A1 Oct. 11, 2012

Related U.S. Application Data

(63) Continuation of application No. 12/789,256, filed on May 27, 2010, now Pat. No. 8,266,181.

(51) Int. Cl.
*G06F 17/30* (2006.01)
(52) U.S. Cl.
CPC ..................... *G06F 17/30* (2013.01)
USPC ............ 707/791; 707/802; 707/822; 707/828
(58) Field of Classification Search
USPC .................................................. 707/600–899
See application file for complete search history.

(56) References Cited

U.S. PATENT DOCUMENTS

| | | | |
|---|---|---|---|
| 3,573,854 | A | 4/1971 | Watson et al. |
| 4,433,377 | A | 2/1984 | Eustis et al. |
| 5,694,578 | A | 12/1997 | Upson et al. |
| 6,305,005 | B1 | 10/2001 | Burnham |
| 6,339,775 | B1 | 1/2002 | Zamanian et al. |
| 6,597,292 | B1 | 7/2003 | Shigyo |
| 6,694,310 | B1 | 2/2004 | Yu et al. |
| 7,096,369 | B2 | 8/2006 | Matsui et al. |
| 7,149,746 | B2 | 12/2006 | Fagin et al. |
| 7,243,098 | B2 | 7/2007 | Wang et al. |
| 7,283,121 | B2 | 10/2007 | Adan et al. |
| 7,356,519 | B1 | 4/2008 | Goldberg et al. |
| 7,440,942 | B2 | 10/2008 | Dixon et al. |
| 7,506,324 | B2 | 3/2009 | Thiagarajan et al. |
| 7,532,622 | B2 | 5/2009 | Pung et al. |

(Continued)

FOREIGN PATENT DOCUMENTS

| | | |
|---|---|---|
| JP | 402157938 | 6/1990 |
| JP | 02008293387 | 12/2008 |

OTHER PUBLICATIONS

IBM, IBM WebSphere DataStage and QualityStage: Parallel Job Developer Guide, pp. 1-133, Version 8, Release 1, 2008, IBM Corporation, Armonk, New York, United States.

(Continued)

*Primary Examiner* — Isaac M Woo
(74) *Attorney, Agent, or Firm* — Patterson & Sheridan, LLP

(57) ABSTRACT

Embodiments of the invention provide a method and apparatus for providing additional functionality to a data processing program. This is achieved by various means, including pre-processing records in a data volume, designating certain records with a key-break, and creating an aggregation structure that user programs may use to store previously-processed records from the data volume.

15 Claims, 7 Drawing Sheets

(56) References Cited

U.S. PATENT DOCUMENTS

| | | | |
|---|---|---|---|
| 7,590,644 | B2 | 9/2009 | Matsakis et al. |
| 2006/0251106 | A1 | 11/2006 | Nakagawa et al. |
| 2009/0077010 | A1 | 3/2009 | Muras et al. |
| 2009/0077054 | A1 | 3/2009 | Muras et al. |
| 2009/0077078 | A1 | 3/2009 | Uppala et al. |
| 2009/0138139 | A1 | 5/2009 | Tsai et al. |
| 2009/0287986 | A1* | 11/2009 | Vishniac et al. .............. 714/819 |
| 2011/0295867 | A1 | 12/2011 | McClean et al. |

OTHER PUBLICATIONS

IBM, IBM WebSphere DataStage and QualityStage: Parallel Job Developer Guide, pp. 134-267, Version 8, Release 1, 2008, IBM Corporation, Armonk, New York, United States.

IBM, IBM WebSphere DataStage and QualityStage: Parallel Job Developer Guide, pp. 268-401, Version 8, Release 1, 2008, IBM Corporation, Armonk, New York, United States.

IBM, IBM WebSphere DataStage and QualityStage: Parallel Job Developer Guide, pp. 402-534, Version 8, Release 1, 2008, IBM Corporation, Armonk, New York, United States.

IBM, IBM WebSphere DataStage and QualityStage: Parallel Job Developer Guide, pp. 535-663, Version 8, Release 1, 2008, IBM Corporation, Armonk, New York, United States.

IBM, IBM WebSphere DataStage and QualityStage: Parallel Job Developer Guide, pp. 1-665, Version 8, Release 1, 2008, IBM Corporation, Armonk, New York, United States.

McClean, G. M., Line Item Document: DataStage Core: Information Server 8.5: LIDS017, Transformer Looping Enhancements, PRD REQ015, pp. 1-30, 2008, IBM Corporation, Armonk, New York, United States.

Ascential Software Corporation, Orchestrate 7.5: Operators Reference, Jun. 2004, pp. 1-942, Ascential Software Corporation, Westboro, MA, United States.

Pu, Xiaoyan, Key Break Support in PX Transform: Information Server 8.5, pp. 1-15, 2008, IBM Corporation, Armonk, New York, United States.

McBurney, Vincent, Information Integration: Optimizing Data Transformation: InfoSphere DataStage Balanced Optimization, IBM Database Magazine, 2008, Quarter 4, vol. 13, Issue 4, IBM Corporation, Armonk, New York, United States.

DSXchange, how to implement oracle lead function in datastage, 2002, retrieved May 26, 2010, <http://www.dsxchange.com/viewtopic.php?p=286227&sid=ba303626571174950bd426d389962d5a>.

Woo, Isaac M., Search Notes, searched Apr. 24, 2012, mailed May 2, 2012 for U.S. Appl. No. 12/789,256.

* cited by examiner

KEY-BREAK AND RECORD-LOOP PROCESSING IN PARALLEL DATA TRANSFORMATION

This application is a continuation of co-pending U.S. patent application Ser. No. 12/789,256, filed May 27, 2010. The aforementioned related patent application is herein incorporated by reference in its entirety.

BACKGROUND

Embodiments of the invention generally relate to data processing. And more specifically, embodiments are related to techniques for key-break and record-loop processing in parallel data transformation in a parallel data processing system.

DESCRIPTION OF THE RELATED ART

A common challenge for many modern computer environments is managing large volumes of data. Various systems and software applications exist today for managing and processing large amounts of data. These tools are very useful for data processing in a broad variety of fields, including web portals, medical applications, financial applications, and web applications, to name but a few examples.

For example, one such application has been created by International Business Machines (IBM) under the name InfoSphere® DataStage®. The DataStage® software application is an extract, transform and load (ETL) utility that is part of the IBM Information Server suite. The DataStage® application features a high performance parallel framework and supports the collection, integration and transformation of large volumes of data. Specifically, DataStage® software uses a pipeline model for processing one record of a data volume at a time, in each stage of the pipeline. Data flow in such a pipeline may be acyclic, allowing data to only flow in one direction. As each stage finishes processing a record, it may pass the record to the next stage in the pipeline for further processing. For example, one stage may be a transformer stage, through which users may modify, add or remove data in a record of a data volume, one record at a time, while another stage may be a data source stage, which reads the records in from a source data volume. In this example, the data source stage may read a record from the data volume, and then pass the record to the transformer stage for processing.

Additionally, the DataStage® application may use data-partitioned parallelism to increase performance in certain stages. That is, input data may be partitioned or re-partitioned as needed while flowing through the pipeline. If a stage is able to process records in parallel, input records to that stage are first partitioned, and then the data on each partition is processed by an instance of that stage. For example, data entering the transformer stage may be partitioned into four partitions, and then four instances of the transformer may process the partitioned data, with each stage processing a separate partition of input data. By taking advantage of data-partitioned parallelism, the DataStage® application is able to process records more efficiently and effectively.

Although the parallel nature of pipeline processing gives applications such as DataStage® increased performance, it also leads to additional challenges, as, due to their pipelined nature, these applications process the data volume one record at a time. For example, certain transformer operations may require information about subsequent records in the data volume. However, this information may be unavailable until those subsequent records are processed by the transformer. For instance, in a data volume containing multiple groups of records, it can be inefficient to calculate each record's percentage contribution to the record's group, because a user cannot determine if a particular record is the last record in a group without reading the subsequent record. As such, users must currently use multiple operations in user programs in order to attempt to work around this deficiency.

Likewise, some transformer operations may require information about previously-processed records. For instance, in an aggregation function, a user may wish to calculate the sum of all the records in a particular group. However, because data in such a pipeline is processed one record at a time, users may be unable to look "backwards" to previously-processed records. For example, if a user wished to calculate the sum of all the records in a particular group, users currently must use multiple operators in a user program in order to solve a simple aggregation problem. The result is additional complexity and inefficiencies both in the user program and in the transformation stage.

SUMMARY

The present disclosure generally provides techniques for processing data in a pipelined processing system.

One embodiment of the invention provides a computer-implemented method of processing data in a pipelined processing system. The method includes: preprocessing a plurality of records, including: for each record of the plurality of records: determining whether the record is a last record in a group, and upon determining the record is the last record in the group, setting a key-break flag for the record, wherein the key-break flag designates the record as the last record in the group; reading, in a first stage of the pipelined processing system, a first record from the plurality of records; determining, in a second stage of the pipelined processing system, whether the key-break flag has been set for the first record, indicating that the first record is the last record in the group; and upon determining that the key-break flag is set, performing, in the second stage of the pipelined processing system, a transformation operation on the first record, to create a transformed record.

Another embodiment of the invention provides a computer-readable storage medium containing a program which, when executed, performs an operation. The operation includes: preprocessing a plurality of records, including: for each record of the plurality of records: determining whether the record is a last record in a group, and upon determining the record is the last record in the group, setting a key-break flag for the record, wherein the key-break flag designates the record as the last record in the group. The operation further includes reading, in a first stage of the pipelined processing system, a first record from the plurality of records. Additionally, the operation includes determining, in a second stage of the pipelined processing system, whether the key-break flag has been set for the first record, indicating that the first record is the last record in the group; and upon determining that the key-break flag is set, performing, in the second stage of the pipelined processing system, a transformation operation on the first record, to create a transformed record.

Yet another embodiment of the invention provides a system, including: a computer processor; and a memory containing a program that, when executed on the computer processor, is configured to perform an operation for processing data in a pipelined processing system. The operation includes: preprocessing a plurality of records, comprising: for each record of the plurality of records: determining whether the record is a last record in a group, and upon determining the record is the last record in the group, setting a key-break flag for the record, wherein the key-break flag designates the record as the last record in the group. The operation further includes reading, in a first stage of the pipelined processing system, a first record from the plurality of records. Additionally, the operation includes determining, in a second stage of the pipelined processing system, whether the key-break flag has been set for the first record, indicating that the first record is the last record in the group; and upon determining that the key-break flag is set, performing, in the second stage of the pipelined processing system, a transformation operation on the first record, to create a transformed record.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
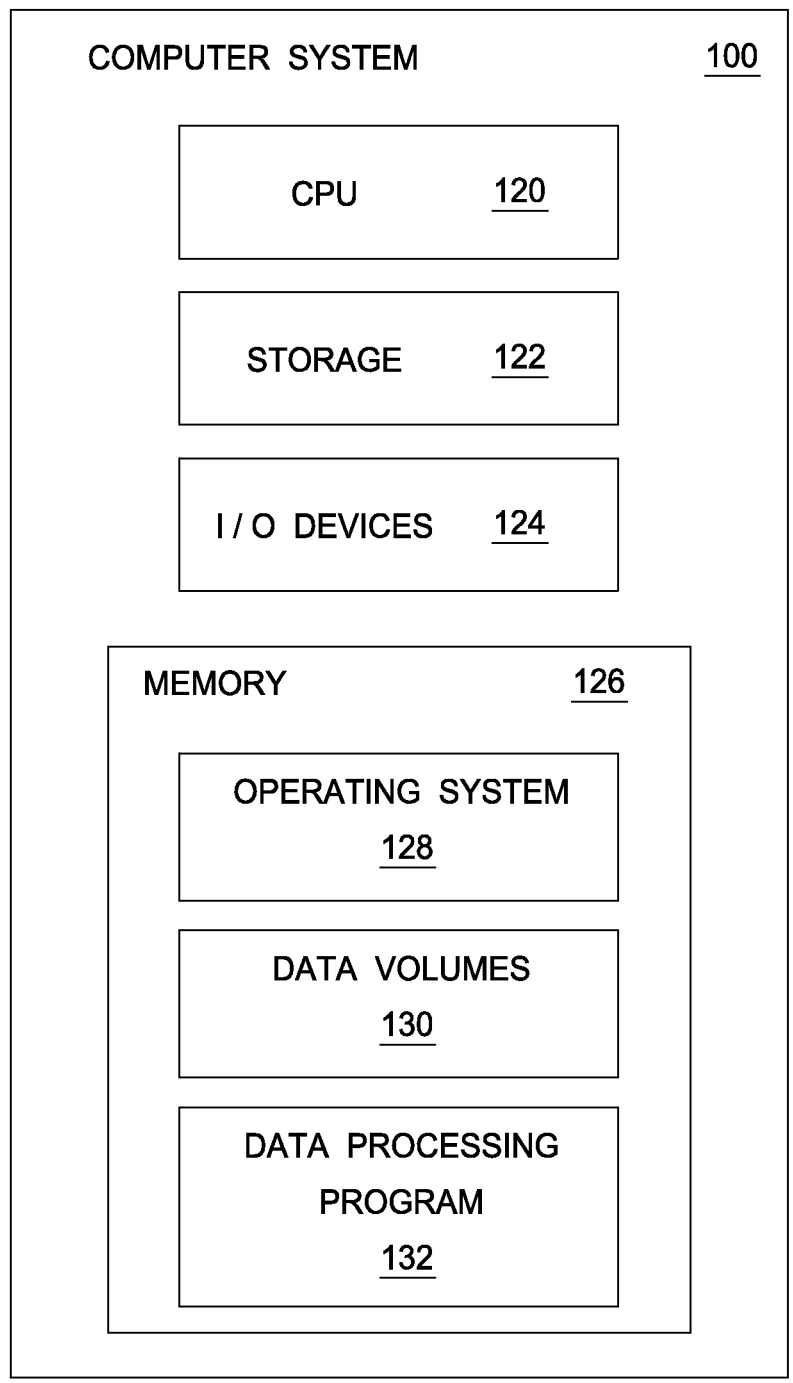
FIG. 1 is a block diagram of components of a computer system configured to run a data processing program, according to one embodiment of the present invention.

As data volumes increase in size, it becomes an increasingly difficult and time-intensive task to manage and process the data. Furthermore, although pipelined data processing systems such as the DataStage® software application allow for data to be processed in parallel, there are inefficiencies that result from this pipelined approach. These inefficiencies are particularly apparent when performing operations involving groups of data in a data volume. For instance, a user cannot currently determine whether a record is the last record in its group, without reading the next record in the data volume. That is, if the subsequent record is in a different group, the user may determine the current record is the last record in its group. In such a scenario, it would be beneficial if users could look "ahead" at subsequent records to determine if the current record is the last record in its group. Furthermore, without the ability to look "backwards" at previously processed records, users must use multiple operations in order to perform aggregation operations, such as calculating the sum of all the records in a group. Thus, the result is both user programs and the transformer stage in general are inefficient. Embodiments of the invention allow users to effectively look both "ahead" at subsequent records and "behind" at previously-processed records. This requires fewer operations to perform certain tasks, such as aggregation operations, and results in simpler and more efficient user programs and calculations.

In one embodiment, a preprocessing component reads a first record and a second record from the data volume. Once the records have been read, the preprocessing component may determine whether the first record and second record belong to the same group. If the first record and second record are not in the same group, the preprocessing component may set a key-break flag for the first record, indicating that the first record is the last record in its group. A processing component may then process the first record and allow users to query the key-break flag, thus providing the user a mechanism to determine whether the first record is the last record in its group. Furthermore, the processing agent may allow users to store the first record in an aggregation structure, such that the first record may be retrieved from the aggregation structure when processing subsequent records.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, this figure is a block diagram of components of a computer system configured to run a data processing program, according to one embodiment of the present invention. As shown, computer system 100 includes computer processor(s) 120, storage media 122, one or more I/O devices 124, and system memory 126. Computer processor 120 may be any processor capable of performing the functions described herein. I/O devices 124 may represent a variety of input and output devices, including keyboards, mice, visual displays, printers and so on. Furthermore, as will be understood by one of ordinary skill in the art, any computer system capable of performing the functions described herein may be used.

In the pictured embodiment, memory 126 contains an operating system 128 and data volumes 130. The memory 126 may include one or more memory devices having blocks of memory associated with physical addresses, such as random access memory (RAM), read only memory (ROM), flash memory or other types of volatile and/or non-volatile memory. The operating system 128 may be any operating system capable of performing the functions described herein. As shown, memory 126 also contains a plurality of data volumes 130. Data volumes 130 may be any file, file server, database, web application or data stream that contains or produces data. An individual data volume 130 may include a plurality of records, with each record containing one or more data values. Furthermore, the records of a data volume may be organized into one or more groups. Data volumes 130 are discussed in more detail in FIG. 3.

Memory 126 also contains a parallel data processing program 132. In one embodiment of the invention, parallel data processing program 132 is an instance of the DataStage® software application. Of course, the data processing program 132 may represent any computer program capable of performing the data processing functions described herein. The parallel data processing program 132 may read and process the data volumes 130 in a pipelined manner. In other words, the data processing program 132 uses a plurality of different stages working in parallel, with each stage processing one record at a time, and then passing the record to the next stage in the pipeline. In addition, at least one of these stages may perform operations on the records according to a user program. For example, a user program may contain operations to double every value in a data volume. When executing such a user program, the data processing program 132 may read in each record in the data volume 130 (in a first stage), double the value contained in the record (in a second stage), and output the doubled values to a target data volume 130 (in a third stage).

Although using multiple stages to process records in parallel may improve the performance of data processing program 132, there are several drawbacks to this method. Due to the pipelined nature of this method, records are processed one at a time. One obstacle when processing a data volume 130 one record at a time is that, when processing a current record, some operations may require information about subsequent records to determine how to process the current record. For example, some operations may involve calculations on groups of data, but the pipelined approach does not determine whether a particular record is the last record in its group without looking at subsequent records. As such, users are forced to use multiple operations to account for this deficiency, resulting in inefficient user programs. In one embodiment, data processing program 132 may preprocess a particular data volume 130, prior to processing the data volume 130.

For example, in a data volume 130 containing records organized into groups, a preprocessing component of the data processing program 132 may set a key-break flag for each record that is the last record in its group. The data processing program 132 may provide an Application Programming Interface (API) that allows user programs to query the key-break flag. As such, user programs may simply query the key-break flag to determine if a particular record is the last record in its group, thus resulting in more efficient user programs.

Furthermore, when processing a current record in a data volume 130, some operations may require information regarding previously processed records. For example, a user may wish to calculate the sum of all records in a data volume 130 that contain a data quality value greater than a quality threshold value. However, when processing a particular record in data volume 130, a user cannot look back at and calculate the sum of previously processed records whose data quality value exceeded the quality threshold value. As such, user programs require multiple operations to look back at previously processed records. In one embodiment, data processing program 132 may contain an aggregation structure for storing records. For instance, continuing with the above example, a user may add each record whose data quality value exceeds the quality threshold value to the aggregation structure. When the user program finishes processing all the records in the data volume 130, the user program may calculate the sum of the records contained in the aggregation structure, thus resulting in a more efficient user program.

Figure 2:
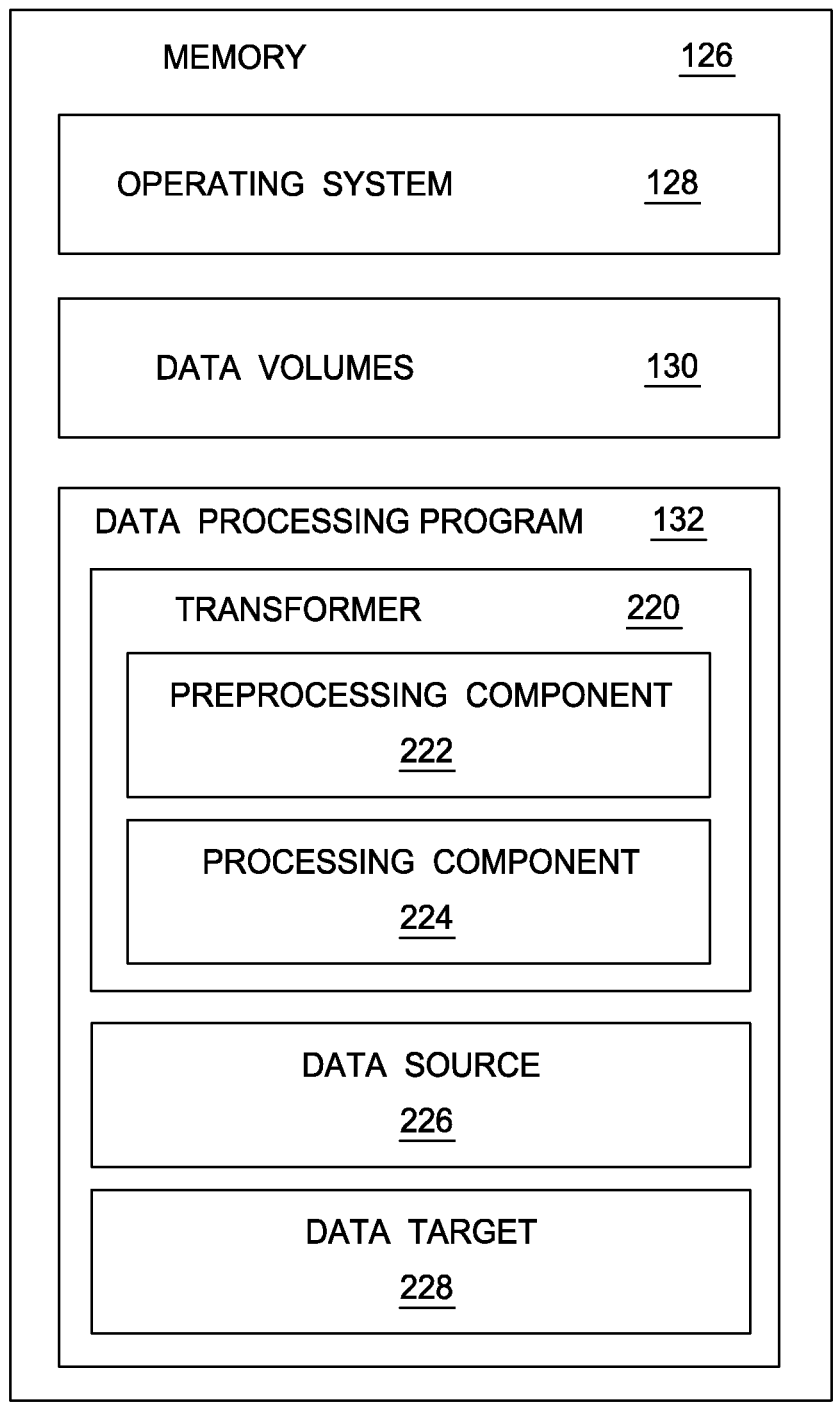
FIG. 2 is a block diagram of a computer memory of the computer system of FIG. 1, according to one embodiment of the invention.

FIG. 2 is a block diagram of a computer memory of the computer system of FIG. 1, according to one embodiment of the invention. As shown, memory 126 contains an operating system 128, one or more data volumes 130, and the data processing program 132. In one embodiment, the data processing program 132 is an instance of the DataStage® software application. Furthermore, the data processing program 132 contains a transformer stage 220, a data source 226 and a data target 228. The data source 226 provides input data to the data processing program 132, and may be any data volume 130 from which records may be read. Likewise, the data target 228 stores output data from the application 132, and may be any data volume 130 to which records may be written. Although the data source 226 and data target 228 components of FIG. 2 are shown as residing in memory 126 as part of the application 132, the actual data volumes 130 that these components read from and write to may be stored in other locations, including, but not limited to, other locations in memory 126, storage media 122 on the computer system 100, or storage media on another computer system accessible over a network.

The transformer 220 may perform various operations on the data read from the data source 226, with these operations including, but not limited to, data type conversion, string manipulation, and arithmetic operation. The operations performed by the transformer 220 may be specified by a user program. The user program may contain code representing transformation logic, and the transformer 220 may execute this user program against the input data read from the data source 226 to produce output data. The output data may subsequently be written to the data target 228. In one embodiment, the transformer 220 includes a preprocessing component 222 and a processing component 224. The preprocessing component 222 may process records from the data source 226 before the processing component 224 processes the records. In one embodiment, the preprocessing component 222 processes every record in the data source 226 before the processing component 224 begins processing the first record in the data source 226. In an alternate embodiment, the preprocessing component 222 always stays a fixed number of records ahead of the processing component 224. For example, the preprocessing component 222 may work a single record ahead of the processing component 224, and set a flag for records that are the last record in their respective groups. The processing component 224 may then query the flag when processing each record, and determine whether the record is the last record in its group based on the status of the flag.

Figure 3:
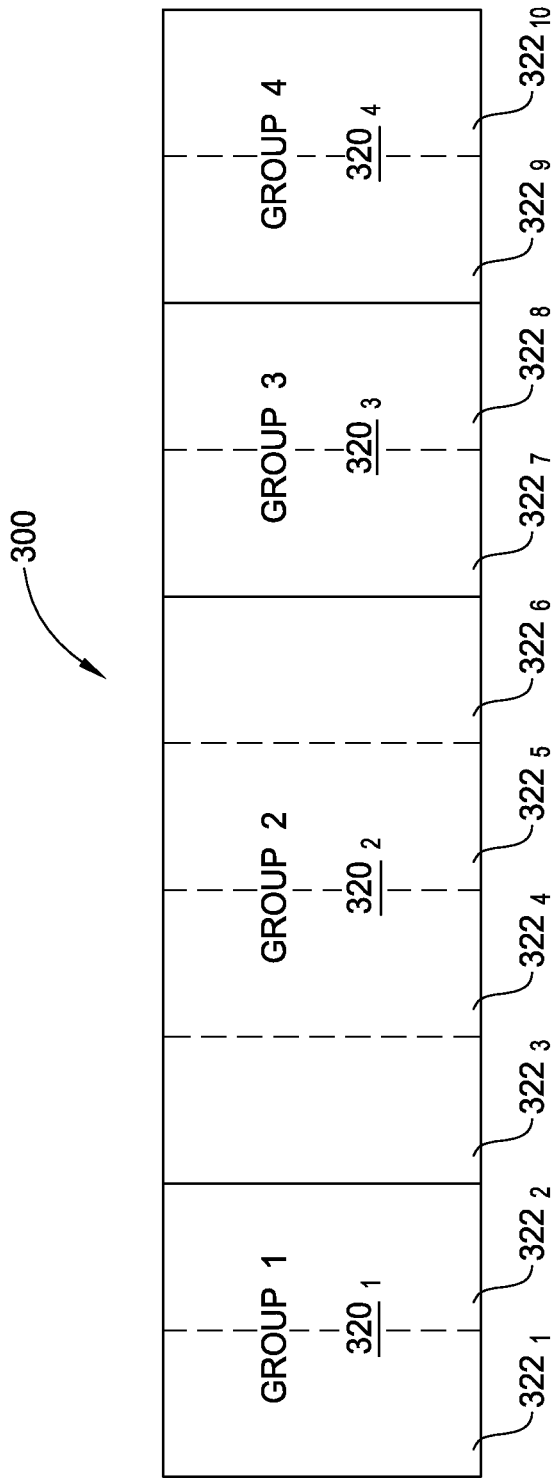
FIG. 3 is a block diagram of a data volume containing groups of data, according to one embodiment of the invention.

FIG. 3 is a block diagram of a data volume containing groups of data, according to one embodiment of the invention. As shown, data volume 130 contains four groups 320. Furthermore, each group 320 contains multiple records 322. For instance, group $320_1$ contains two records $322_1$ and $322_2$. In addition, the groups 320 in the data volume 130 do not need to be uniform, and may contain different numbers of records. For instance, while group $320_1$ contains two records, $322_1$ and $322_2$, group $320_2$ contains four records, $322_3$, $322_4$, $322_5$ and $322_6$. Of course, not all data volumes 130 will contain continuous groups 320 of records 322, as are shown in FIG. 3, where the entirety of one group 320 is collected together, followed by the entirety of another group 320, and so on. In the case that the groups 320 are not continuous but instead are intermixed throughout the data volume 130, the data volume 130 may first be sorted by group, so that the records 322 will be organized into continuous groups 320.

As discussed above, one limitation to processing a single record 322 at a time is that a user cannot determine if a given record is the last record in its group 320 without looking ahead at the next record in the data volume 130. For example, if the transformer 220 is currently processing record $322_2$, the transformer 220 may determine that the record is in group 1 $320_1$. However, the transformer 220 cannot determine whether record $322_2$ is the last record in its group until the transformer 220 processes the next record $322_3$ and determines that record $322_3$ is in group 2 $320_2$. Because the transformer 220 processes only a single record at a time, the transformer 220 may not process the next record until after it has finished processing the current record. Therefore, it would be advantageous if the transformer 220 had a mechanism through which it could look "ahead" at subsequent record.

Figure 4:
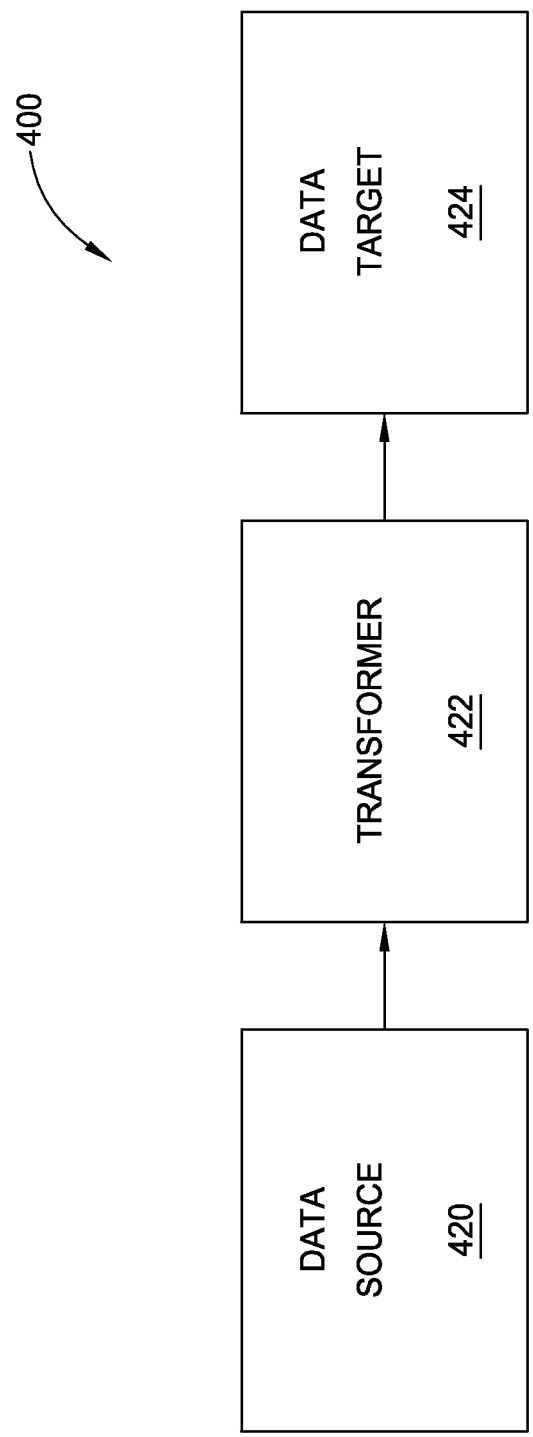
FIG. 4 is a block diagram illustrating multiple stages of a data processing program, according to one embodiment of the invention.

FIG. 4 is a block diagram illustrating multiple stages of a parallel data processing program, according to one embodiment of the invention. In the simplest example of processing a single record 322, a record 322 is read from a source data volume 130 in the data source stage 420. As discussed above, the data source component 226 may read from any readable data volume 130. Once the record is read from the data source, the record is passed to the transformer stage 422, where user-specified operations may be performed on the record 322 by the transformer 220 to produce a transformed record. Once all user-specified operations are performed in the transformation stage 422, the record may then be passed to the data target stage 424. Here, the data target component 228 may write the transformed record to a target data volume 130.

The above example follows a single record 322 through each stage of FIG. 4. However, when processing multiple records, each stage of the pipeline will be processing a different record in parallel. For example, in processing the data volume 130 shown in FIG. 3, record $322_1$ would first be read from the source data volume (at stage 420). In the second iteration, record $322_1$ is passed to the transformer stage 422, and while transformation operations are being performed on the record $322_1$, record $322_2$ is read from the source data volume (at stage 420). In the third iteration, once record $322_1$ has been transformed, the transformed record is passed to the data target stage 424 to be written to a target data volume. While the transformed record is written, transformation operations are being performed on record 322₂ by the transformer stage 422, and record 322₃ are being read from the data source by the data source stage 420. Thus, all stages of the data processing program 132 are operating in parallel, with each stage operating on a different record 322 from the source data volume 130.

Figure 5:
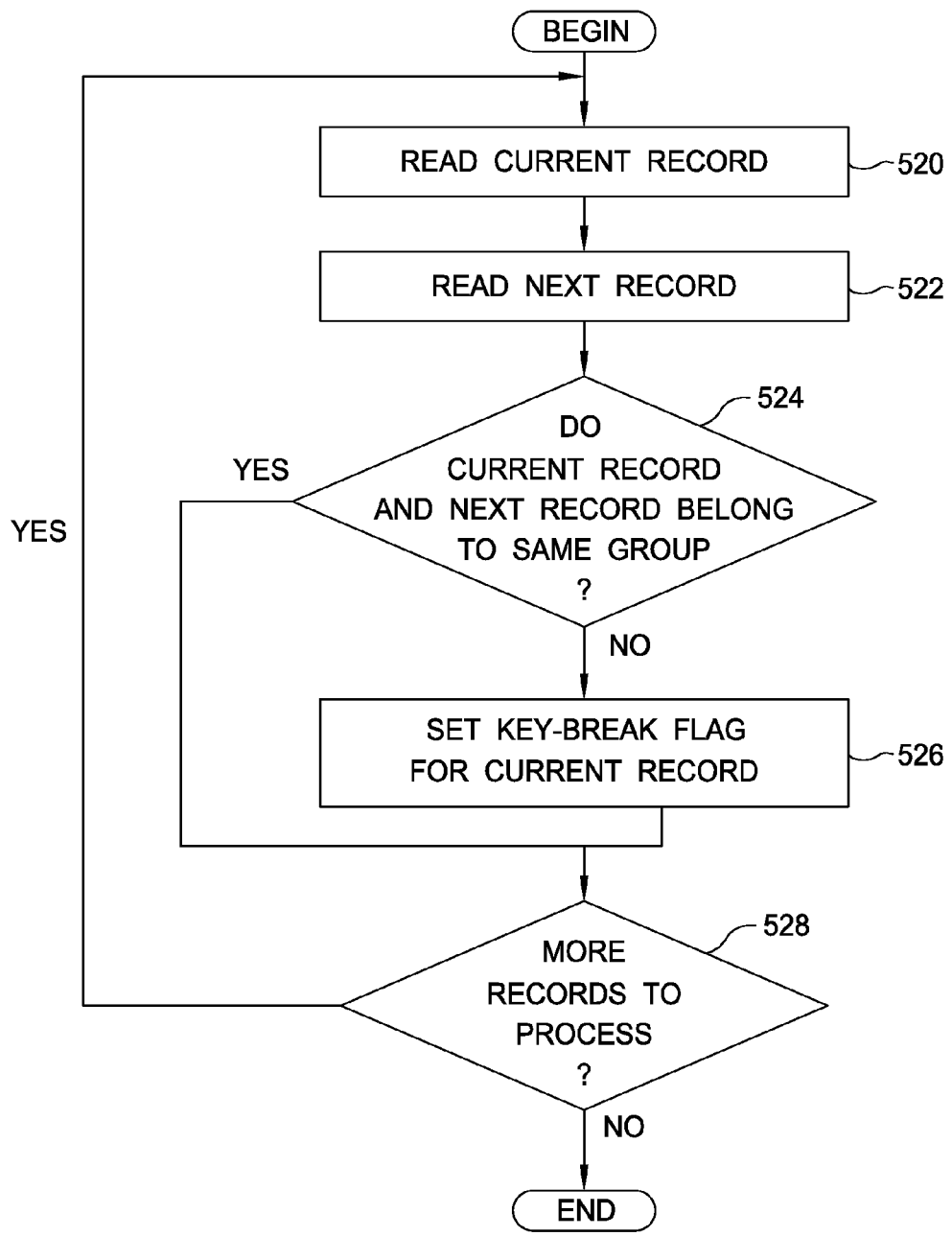
FIG. 5 is a flow diagram illustrating a method of preprocessing a data volume, according to one embodiment of the invention.

FIG. 5 is a flow diagram illustrating a method of preprocessing a data volume, according to one embodiment of the invention. As shown, the method 500 begins at step 520, where a preprocessing component 222 reads a current record 322 from a data volume 130. The preprocessing component 222 then reads the next record in the data volume (step 522). Once the records have been read-in, the preprocessing component may determine whether the current record and next record belong to the same group (step 524). If the records do not belong to the same group, then the preprocessing component 222 sets a key-break flag for the current record (step 526). By comparing the groups of the two records, the preprocessing component may determine whether the current record is the last record in its group. That is, if the records belong to different groups, this indicates that one group is ending and another group is beginning. In that case, the preprocessing component sets the key-break flag for the current record to designate that record as the last record in its group.

If the preprocessing component 222 determines the current record and next record belong to the same group (step 524), or after the key-break flag has been set (step 526), the preprocessing component then determines whether there are more records in the data volume to process (step 528). If the preprocessing component 222 determines there are more records to process, the method begins again at step 520, with the preprocessing component reading the following record in the data volume. Note that the current record (step 520) on the second iteration through the method will be the same record as the next record (step 522) from the first iteration through the method. For example, using the data volume shown in FIG. 3, for the first iteration through the method 500, the current record may be record 322₁ and the next record may be record 322₂. On the second iteration through the method 500, the current record may be 322₂ and the next record may be record 322₃, and so on. If there are no more records to process (at step 528), the method 500 ends.

Figure 6:
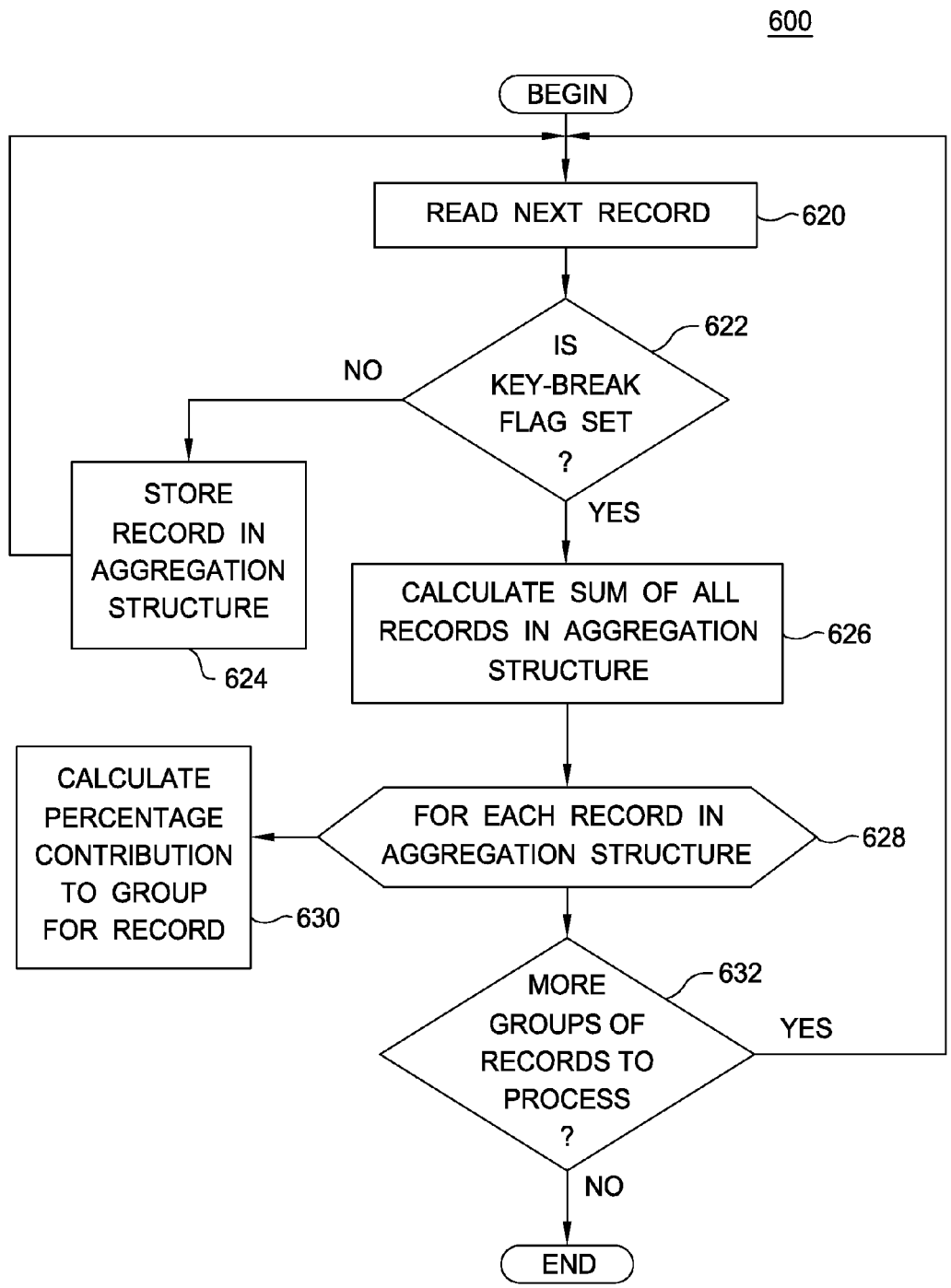
FIG. 6 is a flow diagram illustrating a method of calculating the percentage contribution for a record in a group, according to one embodiment of the invention.

FIG. 6 is a flow diagram illustrating a method of calculating the percentage contribution for a record in a group, according to one embodiment of the invention. Specifically, the method 600 illustrates an example of processing records in a data volume which has already been preprocessed (such as by method 500 shown in FIG. 5). The method 600 begins at step 620, where a data source 226 reads the next record from a data volume 130. After reading the record, the processing component 224 determines whether a key-break flag is set for the record (at step 622). If the key-break flag is not set for the record, the processing component stores the record in an aggregation structure (step 624). In other words, if the record is not the last record in its group, the processing component 224 cannot yet calculate the percentage contribution to the group for the record because not all the records in the group have been read yet, and so the sum of all records in the group cannot yet be calculated. As such, the processing component 224 stores the record in the aggregation structure until the percentage contribution can be calculated (step 624). The method 600 then begins again, with the data source component reading the next record (at step 620).

If the processing component 224 determines the key-break flag is set for the record (step 622), the processing component calculates the sum of all records stored in the aggregation structure (step 626). In other words, the processing component determines that the record is the last record in its group because its key-break flag is set. Furthermore, since the aggregation structure now contains all the records from the group, the processing component may begin calculating the percentage contribution to the group for each record, with the first step of this calculation being calculating the sum of all the records in the group. Once the sum of all the records has been calculated, the processing component 224 then begins a loop (step 628), and for each record in the aggregation structure, calculates the percentages contribution to the group for the record (step 630). For example, for a given record whose value is 10, and assuming the sum of all records in the group was determined to be 100 (step 626), the processing component 224 would then calculate 10/100, and determine the percentage contribution for the record to be 0.1 (or 10%). The calculated percentage value may then be written to a target data volume by the data target component 228, and/or may be displayed to the user using I/O devices 124.

Once the percentage contribution for each record in the group has been calculated (step 630), the data source component 226 then determines whether there are more groups of records in the data volume to process (step 632). If there are more groups of records to process, the method 600 begins again at step 620, where the data source component 226 reads in the next record. If the data source component determines there are no more records in the data volume to process (step 632), the method 600 ends.

Figure 7:
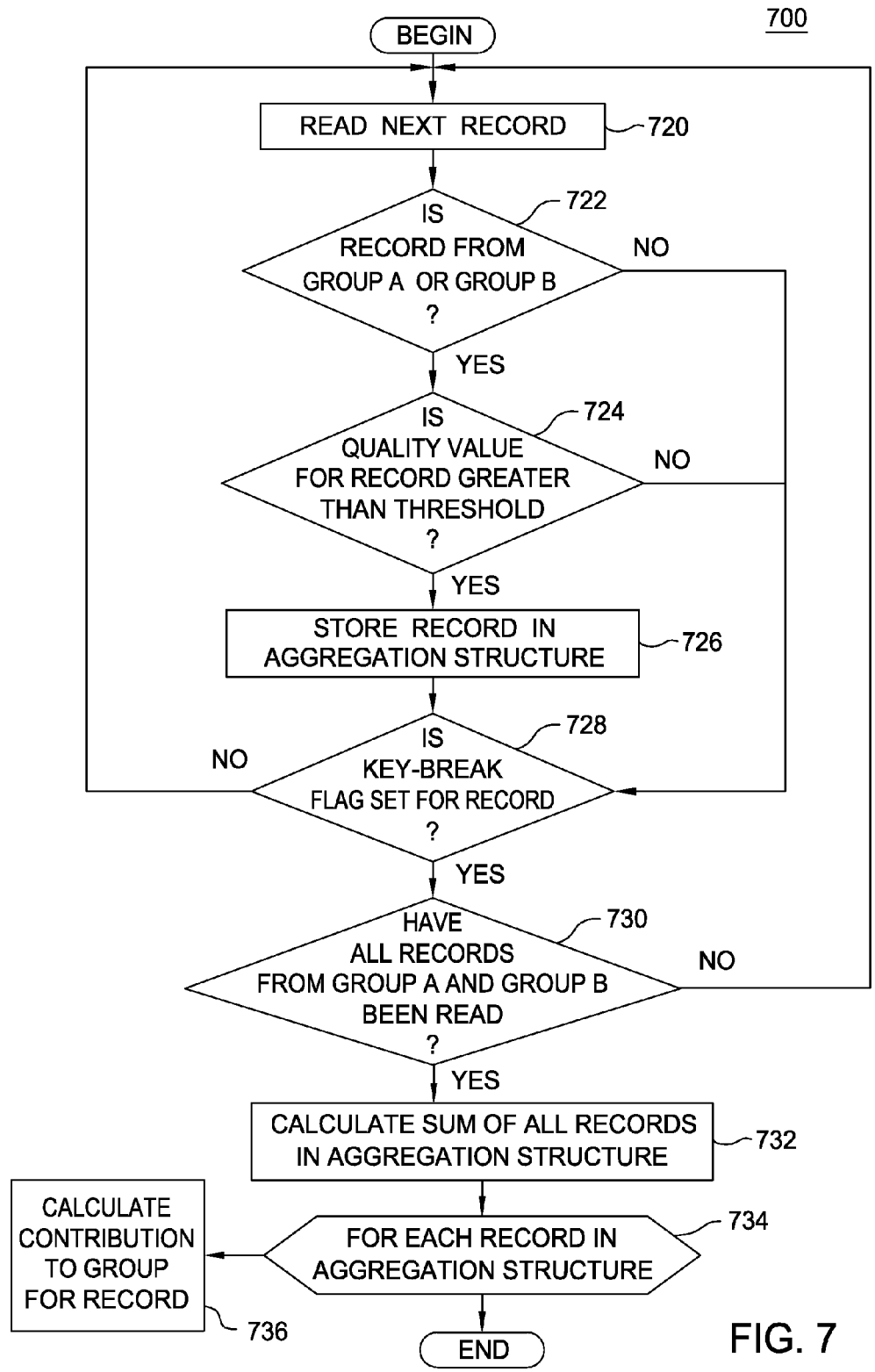
FIG. 7 is a flow diagram illustrating a method of calculating the percentage contribution for a record in a group, according to one embodiment of the invention.

FIG. 7 is a flow diagram illustrating a method 700 of calculating the percentage contribution for a record in a group, according to one embodiment of the invention. Specifically, FIG. 7 shows an example where the processing component is used to calculate a percentage contribution for each record in a set containing records from groups A and B whose quality value exceeds a predetermined quality threshold. The method 700 begins at step 720, where a data source component 226 reads a next record from a source data volume. The processing component 224 then determines whether the record is a member of either group A or group B (step 722). If the processing component 224 determines the record is a member of either group A or group B (step 722), the processing component then determines whether a quality value contained in the record exceeds a predetermined quality threshold amount (step 724). If the quality value is greater than the threshold amount, the processing component 224 stores the record in an aggregation structure (step 726).

Once the record has been stored in the aggregation structure, the processing component determines whether a key-break flag is set for the record (at step 728). Alternatively, if the processing component 224 determines the record is not a member of either group A or group B (step 722), or if it determines the quality value for the record is less than or equal to the quality threshold value (step 724), then the processing component determines whether the key-break flag is set for the record (step 728). If the processing component 224 determines the key-break flag is not set for the record (step 728), the method begins again, with the data source component 226 reading in the next record (step 720). That is, if the key-break flag is not set, the processing component 224 may determine the record is not the last record in its group, and thus there are other records in the group that have not been read yet.

However, if the processing component 224 determines the key-break flag is set (step 728), this indicates that the record is the last record in its group. As such, the processing component 224 then determines whether all records from both group A and group B have been read (step 730). For example, if the key-break flag is set for the current record and if the current record is a member of group B, then processing component 224 may determine that all records from group B have been read. Similarly, if the processing component 224 has previously processed a record from group A where the key-break flag was set for that record, then the processing component 224 may determine that all records from both group A and group B have been processed (step 730). If the processing component 224 determines there are more records from group A and group B to read (step 730), the method begins again, with the data source component 226 reading the next record (at step 720).

If the processing component 224 determines all records from both group A and group B have been read, the processing component 224 calculates the sum of all records stored in the aggregation structure (step 732). The processing component 224 then iterates through each record stored in the aggregation structure (step 734), and for each record, calculates the percentage contribution to the set of all records stored in the aggregation structure for that record (step 736). In other words, the processing component 224 calculates the percentage contribution for each record in the set of records from either group A or group B whose quality values exceed the threshold value. Once the percentage contribution has been calculated for each record (step 736), the method ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of processing data in a pipelined processing system, comprising:
    preprocessing a plurality of records, comprising:
        for each record of the plurality of records:
            determining whether the record is a last record in a group, and
            upon determining the record is the last record in the group, setting a key-break flag for the record, wherein the key-break flag designates the record as the last record in the group;
    reading, in a first stage of the pipelined processing system, a first record from the plurality of records;
    determining, in a second stage of the pipelined processing system, whether the key-break flag has been set for the first record, indicating that the first record is the last record in the group;
    upon determining that the key-break flag is set, performing, in the second stage of the pipelined processing system, a transformation operation on the first record, to create a transformed record; and
    adding, in the first stage of the pipelined processing system, a second record from the plurality of records to an aggregation structure.

2. The method of claim 1, wherein the step of performing, in the second stage of the pipelined processing system, a transformation operation on the first record, to create a transformed record comprises:
    retrieving the second record from the aggregation structure; and
    performing a transformation operation on the first record based on both the first record and the second record, to create a transformed record.

3. The method of claim 1, wherein the second record is added to the aggregation structure only when one or more predetermined conditions are satisfied.

4. The method of claim 1, further comprising:
    writing the transformed record to a target data volume.

5. The method of claim 4, further comprising:
    upon determining the key-break flag is set for the first record, writing a target key-break flag for the transformed record to the target data volume.

6. A non-transitory computer-readable storage medium containing a program which, when executed, performs an operation, comprising:
    preprocessing a plurality of records, comprising:
        for each record of the plurality of records:
            determining whether the record is a last record in a group, and
            upon determining the record is the last record in the group, setting a key-break flag for the record, wherein the key-break flag designates the record as the last record in the group;
    reading, in a first stage of the pipelined processing system, a first record from the plurality of records;
    determining, in a second stage of the pipelined processing system, whether the key-break flag has been set for the first record, indicating that the first record is the last record in the group;
    upon determining that the key-break flag is set, performing, in the second stage of the pipelined processing system, a transformation operation on the first record, to create a transformed record; and
    adding, in the first stage of the pipelined processing system, a second record from the plurality of records to an aggregation structure.

7. A non-transitory computer-readable storage medium of claim 6, wherein the step of performing, in the second stage of the pipelined processing system, a transformation operation on the first record, to create a transformed record comprises:
    retrieving the second record from the aggregation structure; and
    performing a transformation operation on the first record based on both the first record and the second record, to create a transformed record.

8. A non-transitory computer-readable storage medium of claim 7, wherein the second record is added to the aggregation structure only when one or more predetermined conditions are satisfied.

9. A non-transitory computer-readable storage medium of claim 6, the operation further comprising:
writing the transformed record to a target data volume.

10. A non-transitory computer-readable storage medium of claim 9, further comprising:
upon determining the key-break flag is set for the first record, writing a target key-break flag for the transformed record to the target data volume.

11. A system, comprising:
a computer processor; and
a memory containing a program that, when executed on the computer processor, performs an operation for processing data in a pipelined processing system, comprising:
preprocessing a plurality of records, comprising:
for each record of the plurality of records:
determining whether the record is a last record in a group, and
upon determining the record is the last record in the group, setting a key-break flag for the record, wherein the key-break flag designates the record as the last record in the group;
reading, in a first stage of the pipelined processing system, a first record from the plurality of records;
determining, in a second stage of the pipelined processing system, whether the key-break flag has been set for the first record, indicating that the first record is the last record in the group;
upon determining that the key-break flag is set, performing, in the second stage of the pipelined processing system, a transformation operation on the first record, to create a transformed record; and
adding, in the first stage of the pipelined processing system, a second record from the plurality of records to an aggregation structure.

12. The system of claim 11, wherein the step of performing, in the second stage of the pipelined processing system, a transformation operation on the first record, to create a transformed record comprises:
retrieving the second record from the aggregation structure; and
performing a transformation operation on the first record based on both the first record and the second record, to create a transformed record.

13. The system of claim 11, wherein the second record is added to the aggregation structure only when one or more predetermined conditions are satisfied.

14. The system of claim 11, further comprising:
writing the transformed record to a target data volume.

15. The system of claim 14, further comprising:
upon determining the key-break flag is set for the first record, writing a target key-break flag for the transformed record to the target data volume.

* * * * *